E. E. NISWONGER & P. McDORMAN.
ELECTROLYTIC CELL.
APPLICATION FILED SEPT. 28, 1918.
1,292,024.
Patented Jan. 21, 1919.
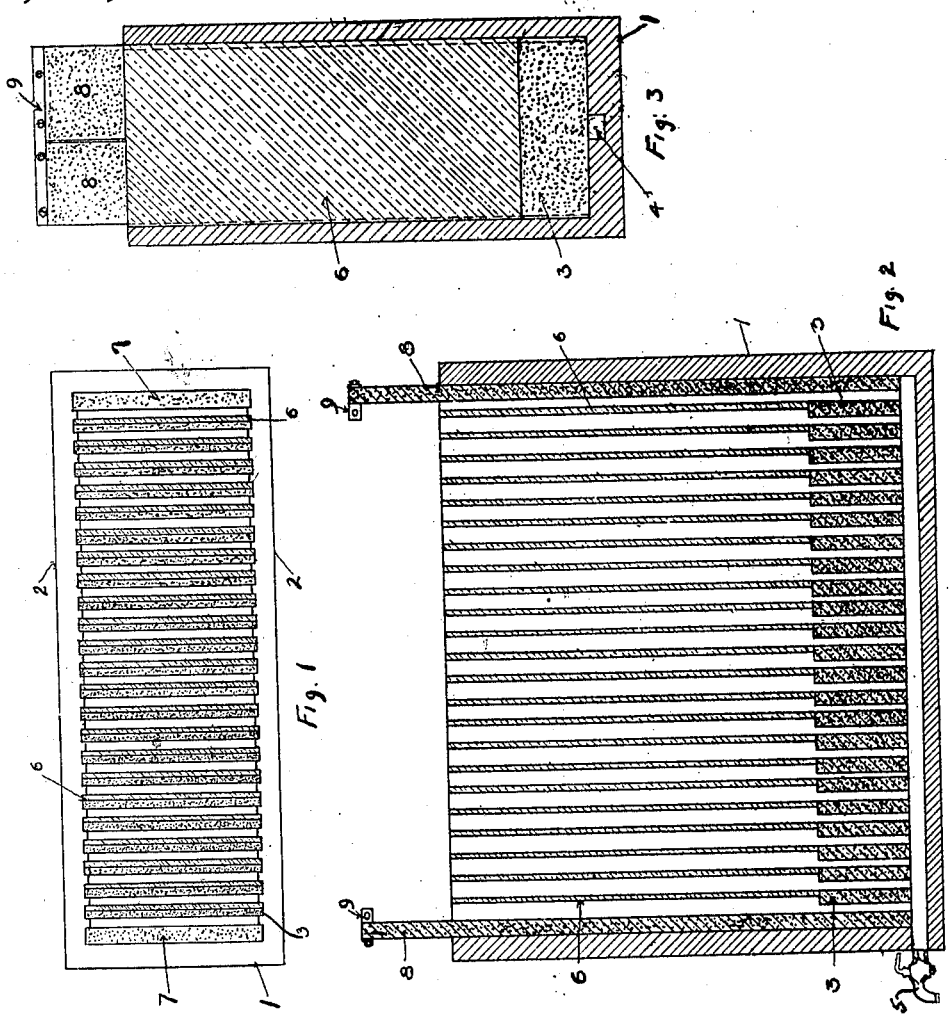
INVENTOR.
Elmer E. Niswonger and Paul McDorman
BY Howard I. Smith
Their ATTORNEYS.

UNITED STATES PATENT OFFICE.

ELMER E. NISWONGER, OF DAYTON, OHIO, AND PAUL McDORMAN, OF NIAGARA FALLS, NEW YORK, ASSIGNORS TO THE ELECTRO CHEMICAL COMPANY, OF DAYTON, OHIO, A CORPORATION OF OHIO.

ELECTROLYTIC CELL.

1,292,024.   Specification of Letters Patent.   Patented Jan. 21, 1919.

Application filed September 28, 1918. Serial No. 256,020.

*To all whom it may concern:*

Be it known that we, ELMER E. NISWONGER, a citizen of the United States, residing at Dayton, in the county of Montgomery and State of Ohio, and PAUL McDORMAN, a citizen of the United States, residing at Niagara Falls, in the county of Niagara and State of New York, have invented certain new and useful Improvements in Electrolytic Cells, of which the following is a specification.

The principal object of our invention is to provide an electrolytic cell in which shunt currents are reduced to the minimum, whereby less amperage is required to produce a given number of liters of the solution.

It is necessary, where a cell is to be employed for hospital use in producing sodium hypochlorite for antiseptic purposes, that it be adapted to operate efficiently on less than 25 amperes of current under standard voltage. It is one of the objects of our invention to accomplish this purpose, by reducing the size of the graphite electrodes and at the same time providing insulating means that coöperate with them to reduce the shunt currents and temperature, whereby the cell may operate efficiently on the amperage available.

It is another object of our invention to provide terminal electrodes that extend well above the top of the cell, to avoid copper connections that become corroded by contact with the electrolyte, causing copper salts to enter the latter.

The preferred form of embodiment of our invention is illustrated in the accompanying drawings, of which Figure 1 is a top plan view of our improved electrolytic cell, with the terminal electrodes removed. Fig. 2 is a longitudinal section taken through said cell. And Fig. 3 is a cross sectional view thereof.

Throughout the specification and drawings, similar reference characters designate corresponding parts.

In a detailed description of the preferred form of embodiment of our invention, the numeral designates an electrolytic cell rectangular in longitudinal section and preferably constructed of hard rubber. The side walls 2 2 of said cell contain oppositely disposed vertical grooves which receive at their lower ends, electrodes 3 of reduced size and preferably constructed of graphite. These electrodes 3 rest upon the bottom of the cell, in which there is provided, below the middle portions of said electrodes, a longitudinal channel 4 which conducts the solution to a faucet 5 at the end of the cell, from which it may be drawn off when desired.

Resting upon the top of each electrode 3, and extending upwardly through its respective grooves in the side walls 2 2 to the top thereof, is an insulating member 6 preferably constructed of glass. These insulating members are provided to eliminate the shunt currents that otherwise would be formed when the size of the electrodes 3 are reduced. This reduction in their size is necessary when, for example, the cell is required to produce sodium hypochlorite for antiseptic purposes in hospitals where the current is of less than 25 amperes.

Too high an amperage is required for electrodes that extend all the way to the top of the cell, and when their size is reduced without providing any insulation, shunt currents are formed that will raise the temperature and lower the efficiency of the cell where it is required to operate under the conditions above mentioned. By providing the glass insulating members 6, shunt currents are reduced to the minimum, with the result that the cell will operate at the proper temperature and efficiency when only a low amperage is available.

Provided at each end of the cell 1 is a transverse groove 7 adapted to receive a pair of terminal electrodes 8 8 which extend all the way to the bottom of the cell and rise well above its top. These terminal electrodes 8 8 are preferably constructed of graphite, and to their top portions are bolted copper bars 9 to receive the lead wires not shown. It will be observed that these terminal electrodes 8 8 extend well above the top of the cell for the purpose of preventing any contact between copper connections and the electrolyte. When exposed to the latter, such connections become corroded, causing copper salts to enter and poison the solution.

We do not wish to be limited to the details of construction and arrangement herein shown and described, and any changes or modifications may be made therein within the scope of the subjoined claims.

Having described our invention, we claim:

1. In an electrolytic cell, a series of electrodes of less height than the cell, mounted in the bottom portion of the latter, and insulating members resting upon said electrodes for the purpose specified.

2. In an electrolytic cell, a series of vertically disposed electrodes of less height than the cell, mounted in the bottom portion thereof, and glass insulating members resting upon said electrodes and extending to the top of the cell for the purpose specified.

In testimony whereof we have hereunto set our hands, ELMER E. NISWONGER the 20th day of September, 1918, and PAUL MCDORMAN the 24th day of Sept., 1918.

ELMER E. NISWONGER.
PAUL McDORMAN.